INVENTOR
GUNNAR E. SUNDBLAD
by
Mason, Kolehmainen, Rathburn and Wyss
ATTORNEYS.

INVENTOR
GUNNAR E. SUNDBLAD
by
Mason, Kolehmainen, Rathburn and Wyss
ATTORNEYS.

May 17, 1966 G. E. SUNDBLAD 3,252,143

DATA HANDLING SYSTEM

Filed Oct. 12, 1959 4 Sheets-Sheet 3

INVENTOR
GUNNAR E. SUNDBLAD
by
Mason, Kolehmainen, Rathburn and Wyss
ATTORNEYS

INVENTOR
GUNNAR E. SUNDBLAD
by
Mason, Kolehmainen, Rathburn and Wyss
ATTORNEYS.

United States Patent Office 3,252,143
Patented May 17, 1966

3,252,143

DATA HANDLING SYSTEM

Gunnar E. Sundblad, Bromma, Sweden, assignor to Svenska Dataregister AB, Stockholm, Sweden, a corporation of Sweden Filed Oct. 12, 1959, Ser. No. 845,873
27 Claims. (Cl. 340—172.5)

This invention relates to a data handling system and, more particularly, to such a system including new and improved means for deriving information from a record medium.

In many data handling systems, data is stored in coded form on various types of record media, such as punched or printed tapes and cards. When the recorded information is reproduced from the record medium in coded form, it is desirable to check the correctness of each reproduced or transmitted code to insure that the data supplied to the system is correct. Although many of the prior systems include means for causing a second or third attempt to be made to obtain a correct code when an incorrect code has been received, those systems do not include means by which incorrect codes can be automatically visually reproduced and rendered capable of manual correction during the sensing operation so that all items of data on the record can be correctly entered into the data handling system.

Accordingly, one object to the present invention is to provide a new and improved data handling system.

Another object is to provide a data handling system including new and improved means for deriving previously recorded data from a record medium and for supplying it in correct form to the system.

A further object is to provide a code sensing arrangement including means for visually displaying incorrect codes.

A further object is to provide an arrangement for reproducing coded information which includes means for correcting inaccurate codes.

Another object is to provide a data handling system in which correctly coded data derived from a record medium is directly supplied to the system and in which incorrectly coded data derived from the record is stored to permit its manual correction and is then supplied to the system.

A further object is to provide a data handling system in which the detection of at least one incorrect code in a plurality of concurrently sensed codes causes the visual display of all of the sensed codes in conjunction with an indication of the incorrect code.

Another object is to provide new and improved means for detecting incorrect coded information.

In accordance with these and many other objects, one embodiment of the invention comprises an audit strip or tape reader adapted for use with record tapes of any of the types well known in the art. In one embodiment, the record tape includes a series of longitudinally spaced lines of data, each of which consists of five transversely spaced characterfields in which dark lines are printed in various coded combinations in accordance with the values of the recorded digits. The strip reader includes a driving mechanism for advancing the audit strip relative to a scanning point at which light from a source is reflected from the surface of the strip and focused on a plurality of photocell sensing elements. These photocells are arranged in groups corresponding to the digit representing fields on the tape and also include a pair of photocells for sensing control information recorded adjacent an edge of the strip.

As the tape is advanced past the scanning point, the photocells actuate a plurality of reading units to store the coded designations of the sensed digits in a plurality of registers. The registers are individually enabled under the control of a reproduced start signal forming a part of each character field. After all the information has been stored in the registers, a check operation is initiated during which a check unit individual to each of the registers examines the code stored in the register to determine whether the proper number of bits is present. In the present application, the system is designed to scan for the presence of an odd number of code bits. Accordingly, each of the character fields is provided with a parity bit if the bits comprising a proper code are even in number, and the parity bit is absent if the proper code for the digit normally includes an odd number of bits. In the event that the codes are correctly stored in all of the registers, the check units provide a read out signal to an external data utilizing device to enable the registers to transfer the codes stored therein to the utilizing device.

Alternatively, if at least one of the registers has an incorrect code stored therein, the check units disable the tape or strip driving means and apply a brake to the tape so that the tape is stopped in a position in which the visual image of the previously sensed codes is applied to a screen. This screen is positioned adjacent a number of lamps each corresponding to one of the simultaneously sensed character fields. The check units control means for illuminating one or more of these lamps to designate the character field or fields in which an incorrect code is provided. Further, a plurality of manually operable keys equal in number to the total number of bits that can be provided in a character field are disposed immediately adjacent the screen on which the visual image of the sensed line of characters is projected. The check units include control circuits for selectively illuminating those of the manually operable keys that correspond to code bits stored in the register.

Thus, by visually inspecting the illuminated keys and the projected line of character fields, the operator is able to determine the incorrect code or codes and to determine what the correct code should be. As an example, if a pencil mark or smudged ink has caused the storage of an incorrect code bit, this will be readily apparent from an examination of the projected image of the character fields. The operator then manually actuates one of the keys in the correct group of keys to either remove or add code bits to provide a correct coded representation of the desired digit. After all of the incorrect codes have been changed to correct coded representations, the operator manually operates the start control so that the check units again check the codes stored in the registers. If the checking operation is satisfactorily completed, the information stored in the registers is transferred to the data utilizing device and the drive means is rendered effective to again advance the audit strip.

Many other objects and advantages of the present invention will become apparent from considering the following detailed description in conjunction with the drawings in which.

Figure 1:
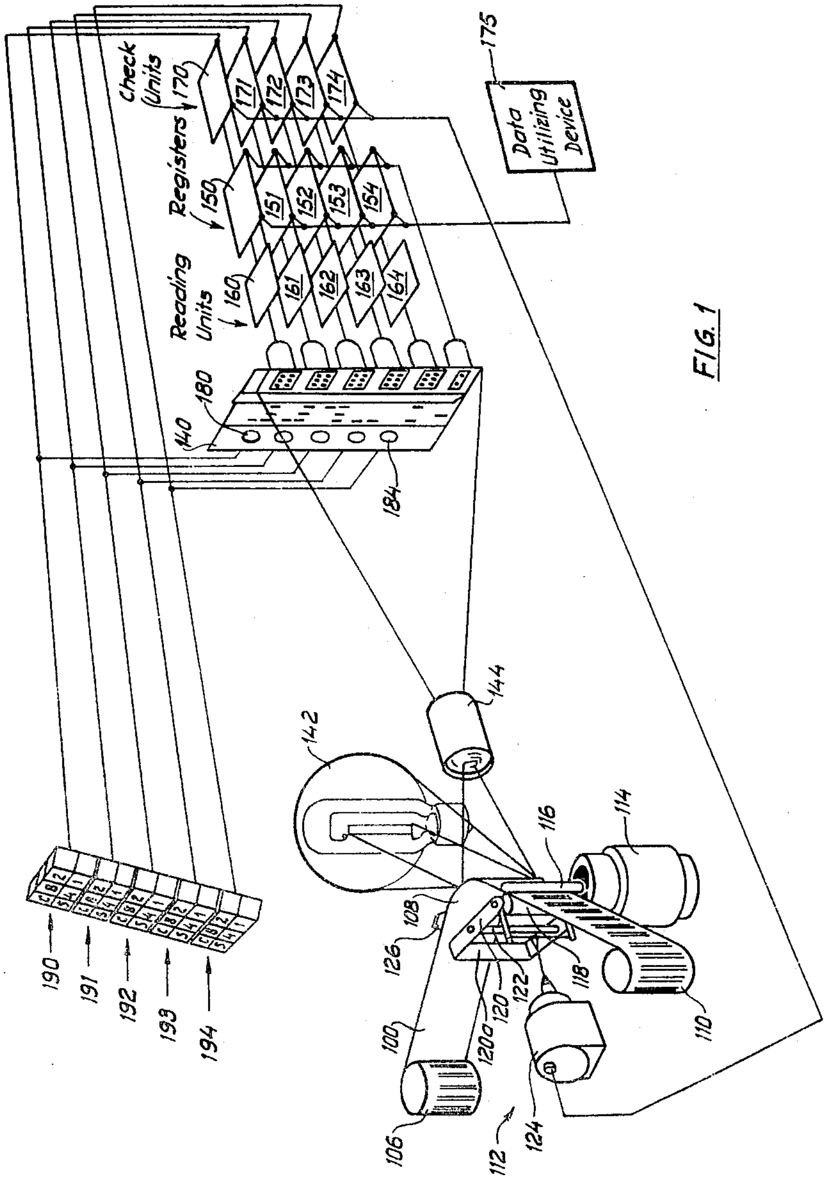
FIG. 1 is a schematic block diagram of a data handling system embodying the present invention.

Referring now more specifically to FIG. 1 of the drawing, therein is shown a data handling system which embodies the present invention and which is adapted for use with a record tape 100 having coded digital information thereon. The audit strip or tape 100 includes a series of transversely extending data lines each comprising a number of discrete character fields. Each of the character fields comprises a generally elongated rectangular area divided into six segments of substantially equal area. Four of the segments represent the binary numbers "1," "2," "4" and "8." These areas of the tape are marked, as by dark printed lines, in various combinations representing the binary codes of the digits "1–9" and "0." In order to insure the accuracy of the coded information, the present system includes means for making a parity check on each of the digit representing codes. This parity check is made on the basis of having an odd number of bits in each code combination, although it should be understood that the parity check can as well be made on the basis of an even number of code bits. Accordingly, one of the remaining areas in each character field is used for the selective storage of a parity bit. If the digit code includes an even number of bits, a black line is recorded in the parity bit area. Alternatively, if the code comprises an odd number of bits, the parity bit is not recorded. The remaining area in each character field is always provided with a black line that is used as a control or start bit. When this bit is sensed, the code sensed by the related group of photocells is transferred from the reading units to the registers.

Figure 2:
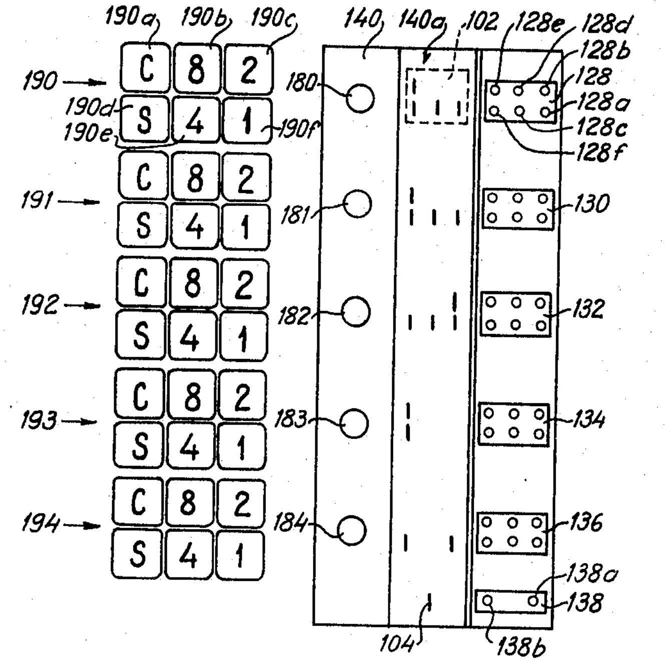
FIG. 2 is a plan view illustrating means for visually displaying sensed codes in conjunction with manually actuated keys for correcting the codes.

Although the paper tape or audit strip 100 can be of any suitable width, the tape used in the present invention is provided with a series of five transversely spaced character fields each forming a character line. One such line is illustrated in FIG. 2 of the drawings wherein is shown a projected image of five character fields that have been concurrently sensed by the reader. As an example, the uppermost character field indicated in dashed outline at 102 includes a parity bit represented by the uppermost line shown to the left, a start bit represented by a dark line located immediately below the parity bit, and two dark lines spaced to the right of the start bit representing the binary numbers "4" and "1," respectively. Thus, the character field 102 provides the correct coded representation of the digit "5." In addition and as illustrated in FIG. 2, each character line of five character fields is provided with a control mark 104 which is printed adjacent the lower edge of the tape so as to appear in the illustrated position in the image shown in FIG. 2. The control mark 104 is used for enabling certain reading operations of the registers and for resetting the registers at the end of the readout operation.

As illustrated in FIG. 1, the audit strip or tape 100 is withdrawn from a supply roll 106, advanced over an arcute guide plate 108, and supplied to a takeup roll or coil 110 by a drive assembly 112. The assembly 112 includes a continuously operating motor 114 to which a capstan 116 is connected. The continuously rotating capstan 116 is selectively rendered effective to advance the tape 100 under the control of a shiftable pinch roller 118. The pinch roller 118 is rotatably mounted on a generally U-shaped frame or bracket 120 which is pivotally mounted on a supporting frame by a shaft 122. The U-shaped bracket 120 is pivotally connected to a solenoid 124 so that when the solenoid 124 is released, the frame 120 is pivoted in the counter clockwise direction by resilient means (not shown). This permits the pinch roller 118 to press the tape 100 against the rotating capstan 116. When the drive assembly 112 is to be rendered ineffective, the solenoid 124 is energized so that the bracket 120 is pivoted in a clockwise direction about the shaft 122. This lifts the pinch roller 118 out of engagement with the tape 100 so that this tape is no longer driven. Further, the clockwise movement of the bracket 120 moves a bight portion 120a into engagement with the tape 100 and presses this tape against a braking plate 126 that is mounted on the main frame. Thus, the tape 100 is positively secured against inadvertent displacement.

To provide means for deriving signals corresponding to the codes recorded on the tape 100, a plurality of reading units 160–164 controlled by a plurality of groups of photocells 128, 130, 132, 134, 136 and 138 (FIG. 2) is provided. The photocells are mounted on a supporting plate 140 that is spaced from the tape driving mechanism. Each of the groups 128, 130, 132, 134 and 136 includes six photocells each corresponding to one of the discrete areas in the character field. As an example, the group 128 of photocells includes six cells 128a–128f representing the binary numbers "1," "2," "4" and "8," the parity check bit, and the start bit, respectively. The group 138 includes two photocells, 138a and 138b, both of which are adapted to sense the control mark 104. The photocells are selectively energized to provide output signals representing recorded information in accordance with the presence or absence of a dark line in the portion of the character field to which each of the photocells is assigned. The photocells are selectively illuminated by a pattern projected from the printed surface of the tape 100. To accomplish this, a light source 142 is provided which illuminates the printed surface of the tape 100 and provides an image which is focused by a lens system 144 to impinge on and to move past the photocell groups 128, 130, 132, 134, 136 and 138.

As each line of character fields moves past the photocell groups, the mark 104 first trips the photocell 138a to clear five code storing registers 150–154 to condition them for receiving information subsequentially sensed by the photocells when the five character fields are moved into a proper position relative to the photocell groups 128, 130, 132, 134 and 136. When the line of five character fields is aligned with the photocells in the groups 128, 130, 132, 134, and 136, the start bit in each of the code character fields renders the registers 150–154 individually responsive to the outputs of the reading units 160–164 which supply marking potentials in accordance with the ones of the photocells that are illuminated or in a darkened condition. When this information is stored in the registers 150–154, a checking operation is initiated by the mark 104 passing the photocell 138b.

More specifically, this checking operation is performed by five check units 170–174 each of which is individual to and is connected to the output of one of the registers 150–154. The check units check the code combination stored in the registers 150–154 to insure that an odd number of code bits has been stored. If all of the code combinations stored in these registers are correct, the check units 170–174 supply a transfer signal to the registers 150–154 so that the stored digits are transferred to a data utilizing device 175. This transfer operation can comprise a parallel transfer operation or a sequential readout of each of the code bits stored in the registers. At the completion of the transfer of the data stored in the registers 150–154 to the data utilizing device 175, the mark 104 in the next succeeding line of characters to be read passes the photocell 138a to cause the registers 150–154 to be cleared to receive the items of information comprising the second line of characters.

Alternatively, if at least one incorrect code combination is stored in one of the registers 150–154, the check units 170–174 cause the energization of the solenoid 124 so that the pinch roller 118 is lifted out of engagement with the tape 100 and the bight portion 120a of the bracket 120 is moved into engagement with the tape 100 to arrest its movement. Since there is a time delay between the reading of the tape and the time at which the solenoid 124 is energized, the image of the sensed line of character fields has been moved from a position aligned with the photocells to an area 140a of the plate 140. This area provides a projection screen on which the image of the previously sensed characters is visually displayed. The check units 170–174 also prevent the transfer of a transfer signal to the registers 150–154 so that this information can not be transferred to the data utilizing device 175. Thus, in response to the detection of an inaccurate code combination, the transmission of information to the output or utilizing device 175 is arrested and a visual display of the previously sensed code character fields is provided on the screen portion 140*a* of the plate 140.

The operator is now provided with a visual display from which the incorrect code can easily be determined. In order to facilitate this determination, the check units 170–174 include means for selectively energizing one of the plurality of lamps 180–184 (FIG. 2) as an indication of the character field in which the improper code has been detected. If more than one incorrect code is detected, more than one of the lamps 180–184, which are physically disposed immediately adjacent the related one of the images of the code character fields, is illuminated. To further identify the code combination that are stored in the registers 150–154 so as to facilitate the determination of the incorrect code and in order to provide means for correcting the codes stored in these registers, five groups of manually actuated keys 190–194 are provided. These groups of keys are disposed immediately adjacent the lamps 180–184 and in horizontal alignment with the portion of the screen 140*a* on which the code character field to which each of the groups of keys 190–194 relates is projected. Each of the groups of keys, such as the group 190, includes six translucent or transparent keys 190*a*–190*f* representing the check bit, the start bit and the binary digits "1," "2," "4" and "8" as indicated by the characters thereon. Each of these keys is provided with an individual illuminating lamp that is connected to and controlled by the proper one of the registers. As an example, the key group 190 corresponding to the uppermost character field on the tape 100 is connected to the register 150 in which the code combination derived from the uppermost character field is stored. Thus, the lamps adjacent the group 190 are energized by the register 150 when an incorrect code is stored therein so that the keys in the group 190 corresponding to the bits actually stored are illuminated.

The operator visually inspects the image of the five sensed character fields in conjunction with the illuminated ones of the lamps 180–184 and key groups 190–194 and determines which of the fields has been improperly sensed. The operator then operates one or more of the keys in the groups 190–194 to supply signals to one or more of the registers 150–154 to correct the codes stored therein. The manual start is then operated so that the illuminated lamps and keys groups are extinguished and another check operation is made. If the checking is satisfactorily completed, the stored digits are transferred to the device 175 and the solenoid 124 is released to start movement of the tape. This operation continues until the entire tape or audit strip 100 has been scanned and the data recorded thereon transferred to the device 175.

Figure 3:
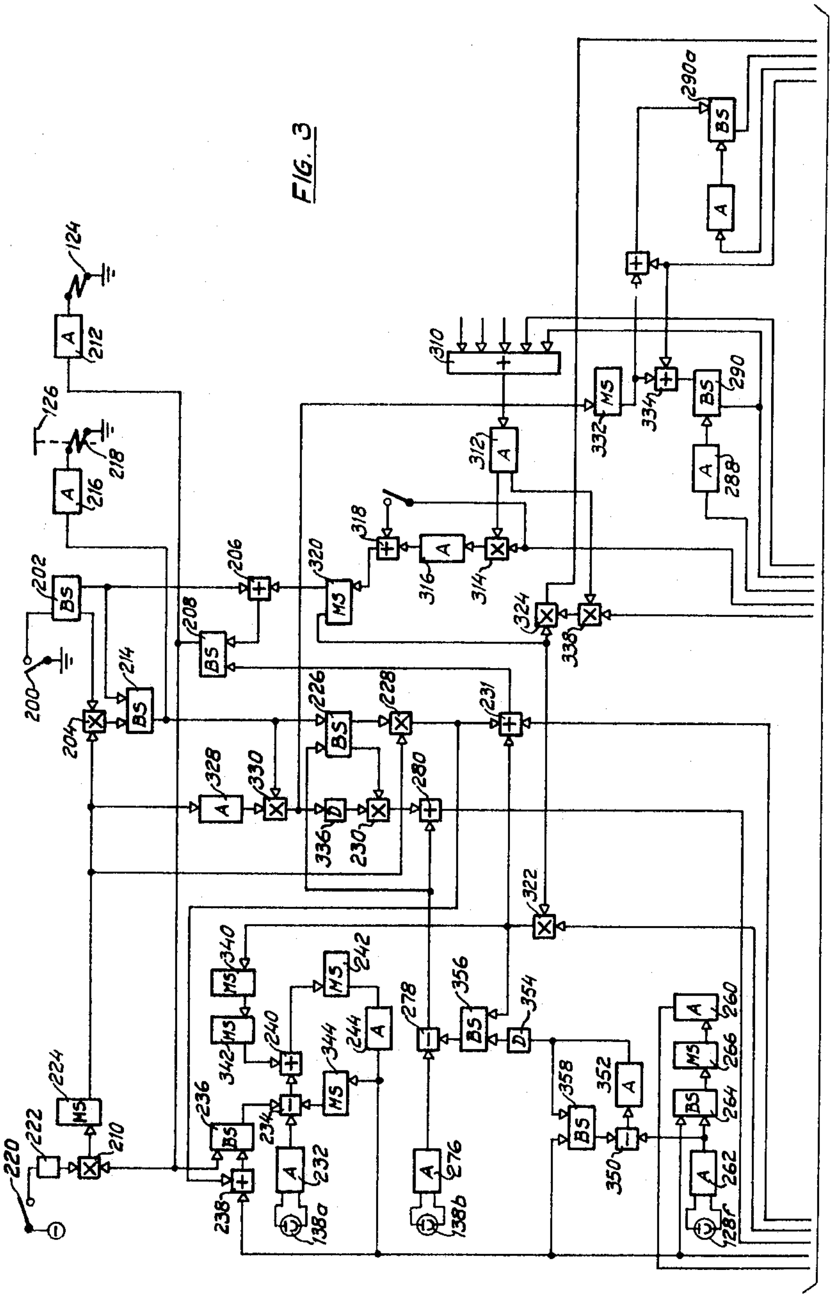
FIGS. 3 and 4, when placed one above the other, form a complete logic diagram of a data handling system embodying the present invention.
Figure 4:
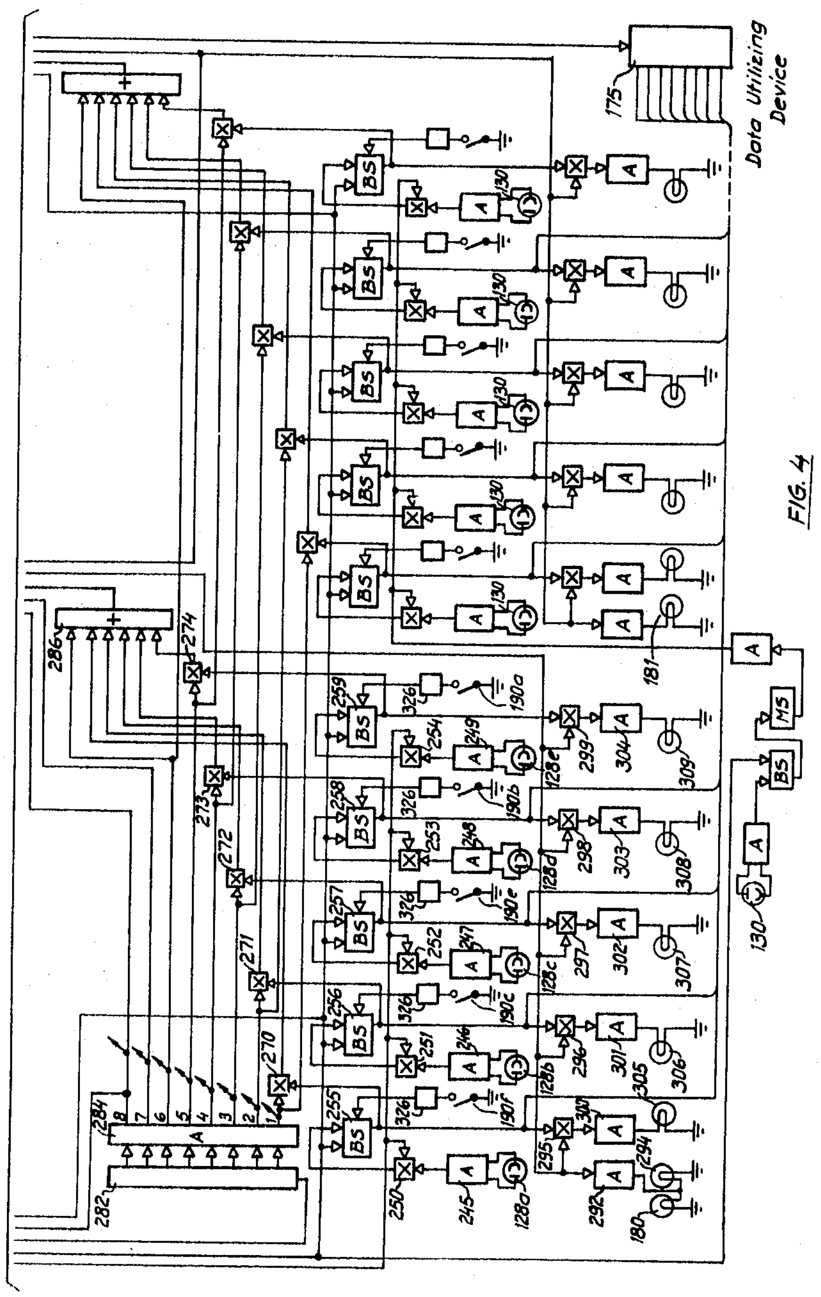

Referring now more specifically to FIGS. 3 and 4 of the drawings, therein is shown a complete logic schematic diagram of a data handling system embodying the present invention. The diagram illustrates logic blocks for the circuit components rather than detailed circuits because the individual components of the system are well known. As an example, the flip-flops, the pulse formers or shapers, the amplifiers or inverters and the gates used in the system can be of the types illustrated and described in detail in two books by R. K. Richards, entitled "Arithmetic Operations in Digital Computers" and "Digital Computer Components and Circuits" published by D. Van Nostrand Company, Inc.

In the normal condition of the circuit, a tape controlled switch 200 (FIG. 3) is held in a closed condition when the tape 100 has not been inserted. This operates a bistable flip-flop 202 to its set condition in which a blocking potential is applied to an "And" gate 204 and a negative potential is forwarded through an "Or" gate 206 to a bistable flip-flop 208. This potential operates the flip-flop 208 to its set condition in which a negative enabling potential is forwarded to an inhibitor circuit 210. This potential is also forwarded to an input of an amplifier 212, the output of which is connected to the solenoid 124. The negative potential supplied to the amplifier 212 energizes the solenoid 124 so that the pinch roller 118 is moved away from the capstan 116 to permit the tape 100 to be threaded into the drive means 112.

The negative potential from the flip-flop 202 is also forwarded to a bistable flip-flop 214 and operates this circuit to its reset condition in which ground potential is supplied to the input of an amplifier 216 to render this amplifier nonconductive. The output of the amplifier 216 is connected to the winding of a solenoid 218. This solenoid is connected to the brake plate 126 and, when released, holds the plate 126 in an ineffective position. Thus, the bight 120*a* is spaced from the plate 126 to permit the insertion of the tape 100. When the tape 100 is inserted into the reader, the switch 200 is opened so that the flip-flop 202 is operated to its reset condition. This removes the inhibiting potential from the flip-flop 208 and supplies an enabling potential to the "And" gate 204.

The operation of the reader is initiated by closing a start key 220 so that a pulse former 222 supplies a negative-going pulse through the "And" circuit 210 to a monostable flip-flop 224. This operates the flip-flop 224 to its set condition so that a negative-going pulse is forwarded through the "And" gate 204 to actuate the flip-flop 214 to its set condition. The output of the flip-flop 214 drops to a negative potential to render the amplifier 216 conductive so that the solenoid 218 is energized to move the brake plate 126 to an effective position. The negative potential at the output of the flip-flop 214 also operates a bistable flip-flop 226 to its set condition so that its negative output potential enables an "And" gate 228 and its ground output blocks an "And" gate 230. When the gate 228 is enabled, the negative potential at the output of the flip-flop 224 is forwarded through the "Or" gate 231 to operate the flip-flop 208 to its reset condition.

When the flip-flop 208 is reset, the enabling potential for the "And" gate 210 is removed to prevent further operation of the manual start key 220 from affecting the system. Further, when the output of the flip-flop 208 rises to ground, the amplifier 212 is rendered ineffective and the solenoid 124 is released so that the pinch roller 118 biases the inserted tape 110 against the capstan 116. The tape 100 is now advanced to the position at which the first line of character fields approaches the groups of photocells 128, 130, 132, 134, 136 and 138.

The first item of data sensed by the photocells is the mark 104 passing the reset photocell 138*a*. This photocell is connected to an amplifier 232, the output of which is connected to an inhibitor circuit 234. One input to the inhibitor circuit 234 is controlled by a bistable flip-flop 236. When the system is in an ineffective state so that the flip-flop 208 is held in a set condition, the output of this flip-flop holds the flip-flop 236 in a reset position in which a ground potential is applied to the inhibitor circuit 234 to block the output thereof. However, when the "And" gate 228 supplies an operating pulse to the flip-flop 208, this circuit also supplies a negative-going signal through an "Or" gate 238 to operate the flip-flop 236 to its set condition in which it supplies a negative enabling potential to the inhibitor circuit 234. Thus, when the photocell 138*a* senses the first control mark 104, the amplifier 232 supplies a negative-going signal through the inhibitor circuit 234 and "Or" gate 240 to actuate a monostable flip-flop 242 to its set condition. This supplies a negative-going signal to an amplifier 244 which provides a negative-going signal for resetting the system to a normal condition in which it is capable of receiving and storing the first sensed line of information. The resetting operation is described in detail below.

The five character fields are next moved into a proper aligned position relative to the photocells 128, 130, 132, 134 and 136. In the drawings (FIG. 4), only the circuits controlled by the photocell groups 128 and 130 are illustrated in detail, but it should be understood that the circuits controlled by the photocell groups 132, 134, and 136 are identical to those illustrated. As an example, the outputs of the photocells 128a–128e, representing the binary bits "1," "2," "4" and "8" and the parity check bit are connected to the inputs of five amplifiers 245–249 forming a part of the reading unit 160. The outputs of these amplifiers are connected to five "And" gates 250–254. The "And" gates 250–254 are connected to five bistable flip-flops 255–259 which form the register 150. The "And" gates 250–254 are normally blocked by the potential supplied at the output of an amplifier 260. In the drawing, the photocells in the group 130 are shown connected to an identical circuit, and like circuit arrangements are controlled by the photocell groups 132, 134 and 136.

When the start mark moves into alignment with the photocell 128f, an amplifier 262 is energized to supply a negative-going pulse to a bistable flip-flop 264. This circuit supplies a negative-going signal to a monostable flip-flop 266 which provides a negative-going signal to the input of the amplifier 260 that is of sufficient duration to cover the possibly different times at which the other portions of the character field move into alignment with the photocells 128a–128e. When the amplifier 260 is energized, an enabling potential is supplied to all of the "And" gates 250–254. The ones of these gates that are provided with a negative enabling potential from the amplifiers 245–249 that are connected to darkened ones of the photocells 128a–128e supply negative-going operating signals to the flip-flops 255–259. These signals operate these flip-flops to their set condition.

In the example shown in FIG. 2, the sensed character field includes "1" and "4" code bits and a parity check bit. Thus, the flip-flops 255, 257 and 259 are operated to their set conditions if the code is correctly sensed so that negative potentials are applied to their outputs. The outputs of the flip-flops 255–259 are connected to five "And" gates 270–274. Thus, only the gates 270, 272 and 274 are now supplied with an enabling potential.

The continuing movement of tthe tape 100 moves the control mark 104 into alignment with the photocell 138b at a time following the storage of the sensed code in the flip-flops 255–259. When the photocell 138b is darkened, an amplifier 276 connected to its output forwards a negative-going pulse through an inhibitor circuit 278 to the flip-flop 226 to operate this circuit to its reset condition. In this condition, the circuit 226 supplies a negative enabling potential to the "And" gate 230 and removes the enabling potential from the gate 228. The negative-going pulse at the output of the inhibitor 278 is also forwarded through an "Or" gate 280 to initiate the operation of a pulse distributor or generator 282 and to start the checking operation.

The pulse distributor 282 can comprise a counting chain for supplying eight sequential time spaced and negative-going pulses to an amplifier 284. The first five outputs of the amplifier 284 are supplied in sequence to the five gates 270–274 and, in multiple, to the corresponding gates associated with the other four character fields. When the first pulse is supplied to the gate 270, this enabled gate forwards a negative-going pulse through an "Or" gate 286 and an amplifier 288 to a bistable flip-flop 290. The input to the flip-flop 290 is connected in common to the controlled conduction devices therein so that each successive pulse supplied to this circuit switches the circuit to its alternate conductive state. Since this circuit is normally operated to its reset condition, the first pulse supplied by the gate 270 operates it to its set condition.

The second pulse supplied by the amplifier 284 is blocked at the gate 271. However, the third pulse is forwarded through the gate 272 to operate the flip-flop 290 to its reset condition. The fourth pulse is blocked at the gate 273, and the fifth pulse passes through the gate 274 to operate the flip-flop 290 to its set condition. The sixth pulse is forwarded directly through the gate 286 to operate the flip-flop 290 to its reset condition. Thus, since the received code stored in the flip-flops 254–259 includes an odd number of bits, the flip-flop 290 is operated to a reset condition by the sixth pulse supplied by the amplifier 284. In a similar manner, it can be seen that if the received code included an even number of bits, the flip-flop 290 would be in a set condition at the time that the sixth pulse is received. The set or reset condition of the flip-flop 290 as well as the set or reset conditions of the corresponding flip-flops associated with the remaining character fields indicates whether the stored codes are correct or incorrect.

Assuming that the code sensed by the photocell group 128 has been incorrectly received because of a pencil mark on the tape 100 causing the improper operation of the flip-flop 256, the gate 271 will pass the second distributor pulse, and the flip-flop 290 remains in a set condition when the sixth pulse has been generated. It is also assumed that the remaining four character fields have been properly sensed so that the flip-flops corresponding to the flip-flop 290, such as a flip-flop 290a, are in a reset condition. Thus, the output of the flip-flop 290a is at ground, while the output of the flip-flop 290 is at a negative potential. This negative potential causes the illumination of the lamp 180 to indicate that the sensing of the uppermost character field resulted in the storage of an incorrect code. This potential also enables the illumination of the keys 190a–190f in accordance with the stored code bits.

More specifically, the negative potential from the output of the flip-flop 290 is forwarded to the input of an amplifier 292 and causes the energization of the lamp 180 and also of a lamp 294 which is disposed immediately below the start key 190d. Thus, the field indicating lamp 180 representing the field from which the faulty code was derived and the start key 190d associated with this field are now illuminated. The output of the flip-flop 290 is also forwarded to an input of each of five "And" gates 295–299. In the illustrated example, the flip-flops 255, 257 and 259 are correctly operated and the flip-flop 256 has been incorrectly operated. Thus, the gates 295–297 and 299 are opened so that the corresponding ones of five amplifiers 300–304 are energized. The outputs of these amplifiers are connected to five lamps 305–309 which are disposed immediately below the keys 190f, 190c, 190e, 190b and 190a, respectively. Thus, the lamps 305, 306, 307 and 309 are energized to illuminate the keys 190f, 190c, 190e and 190a to represent the code bits that have been stored in register 150.

The flip-flops 290 and 290a are also effective to arrest operation of the drive means 112 when a faulty code is detected. The outputs of all of these flip-flops are connected through an "Or" gate 310 to the input of an amplifier 312. If all of the inputs to the "Or" gate 310 are at ground potential, thus indicating that all received codes are correct, the amplifier 312 remains in a normal condition. However, the negative output from the set flip-flop 290 is effective through the "Or" gate 310 to energize the amplifier 312. When the amplifier 312 is energized, a negative enabling potential is supplied to an "And" gate 314. Thus, when the seventh pulse is provided by the amplifier 284, this pulse is forwarded through the gate 314 to energize an amplifier 316. The negative output of the amplifier 316 is forwarded through an "Or" gate 318 to operate a monostable flip-flop 320 to its set condition. When the flip-flop 320 is set, a positive potential is applied to a pair of "And" gates 322 and 324 to block these gates.

The negative output from the set flip-flop 320 is forwarded through the "Or" gate 206 to operate the flip-flop 208 to its set condition. When the flip-flop 208 is set, its negative output potential energizes the amplifier 212 so that the solenoid 124 is operated to disable the tape drive and to brake the tape 100 against further movement. Because of the time delay involved in arresting movement of the tape 100, the visual image of the previously projected line of character fields is now projected on the portion 140*a* of the plate 140 to provide a visual display of the actual codes previously sensed by the photocells. The operation of the flip-flop 208 also forwards an enabling potential to the "And" gate 210 and operates the flip-flop 236 to its reset condition in which the circuit 234 blocks the output of the amplifier 232. It is desirable to block the output of this amplifier at this time to insure that the control mark 104 associated with the next succeeding line of character fields does not trigger a resetting operation by darkening the photocell 138*a*. At this time, the movement of the tape 100 has been arrested, a visual display of the actual information previously sensed is projected on the plate 140, and the lamp 180 and certain lamps under the key group 190 are illuminated to indicate the incorrect code.

The operator can now visually inspect the projected image of the record tape 100 and determine the cause of the incorrect code. In the illustrative example, this inspection will indicate that the flip-flop 256 has been improperly operated. The operator can then actuate the proper one or ones of the keys in the group 190 to correct the code stored in the register 150. The keys 190*a–c*, 190*e* and 190*f* are each connected to one of a plurality of pulse formers 326, the outputs of which are connected to both of the conduction devices in the flip-flops 255–259. Thus, each actuation of one of the keys in the group 190 changes the conductive state of the connected one of the flip-flops 255–259. In the assumed example the operator actuates the key 190*c* so that the pulse former 326 supplies a pulse to set the flip-flop 256 to its reset condition. As soon as this happens, the gate 296 is no longer enabled and the lamp 306 is not illuminated. At this time, all of the registers 150–154 store correct code combinations which can be transferred to the data utilizing device 175. However, before this transfer operation takes place, another check operation is performed.

More specifically, the operation of the reader is initiated by again actuating the start key 220 so that the flip-flop 224 again supplies a negative-going pulse. This pulse is not effective through the gate 228 because this gate is blocked by the reset flip-flop 226. However, the negative signal from the flip-flop 224 passes through an amplifier 328 and an "And" circuit 330 which is enabled by the set flip-flop 214. The negative-going pulse provided at the output of the "And" gate 330 sets a monostable flip-flop 332 so that a negative-going pulse is forwarded through an "Or" gate 334 associated with each of the check means 170–174. The pulses forwarded through the gates 334 in the check units 171–174 connected to registers 151–154 in which correct codes are stored produces no effect. However, the pulse forwarded through the gate 334 in the check unit 170 sets the flip-flop 290 to a reset condition and thus not only prepares this flip-flop for the next check operation but also terminates the illumination of the lamps 180 and 294 and the energized ones of the lamps 305–309. The resetting of the flip-flop 290 terminates the operation of the amplifiers 312 and 316.

The negative-going signal at the output of the "And" gate 330 also passes through a delay circuit 336 to the "And" gate 230 which is now enabled by the reset flip-flop 226. This negative-going pulse passes through the "Or" gate 280 to initiate another cycle of operation of the pulse distributor 282. Since all of the registers 150–154 now store correct code combinations, all of the flip-flips 290 and 290*a* are in a reset condition. Thus, the amplifier 312 remains in an unenergized condition in which the gate 314 is blocked and the gate 338 is enabled. When the eighth pulse is provided by the amplifier 284, the gate 338 supplies a pulse through the gate 324 to the data utilizing device 175. This initiates a cycle of operation during which the information stored in the registers 150–154 is transferred to the device 175. The device 175 is connected to the output of the storage flip-flops, such as the flip-flops 255–259.

The eighth distributor pulse also passes through the "And" gate 322 to set a pair of monostable multivibrators 340 and 342 in sequence. The output of the multivibrator 342 is forwarded through the "Or" gate 240 to operate the flip-flop 242 and the amplifier 244 to supply a negative-going reset pulse. This negative reset pulse restores the storing flip-flops in the registers 150–154, such as the flip-flops 255–259, to their reset condition. This pulse is also effective to restore the reset pulse control flip-flop 236, the start pulse flip-flop 264, and the parity check flip-flops 290 and 290*a*.

The pulse provided by the amplifier 244 and also the pulse provided by the "And" gate 322 reset the flip-flop 208 so that the tape drive means 112 is again rendered effective to advance the tape 100. The operation of the reader continues in the manner described above, except that the storage of correct codes normally causes the direct operation of the data utilizing device 175 at the completion of each scanning operation. In addition, the resetting operation is normally performed under the control of the photocell 138*a* rather than the distributor 282.

The system also includes a number of inhibiting circuits for insuring the proper operation thereof. More specifically, it is necessary to insure that a reset pulse is not inadvertently provided during the interval in which the stored data is being checked and read out. A monostable flip-flop 344 is provided which is operated to its set condition when the amplifier 244 is energized. The positive output of this flip-flop is returned to the inhibitor circuit 234 to prevent the triggering of an additional reset pulse in the interval following the receipt of the first pulse.

It is also desirable to prevent the provision of additional read pulses under the control of the photocell 138*b* after the first such pulse has been received and the generator 282 started. Accordingly, the negative-going output from the amplifier 262 is forwarded thorugh an inhibitor gate 350 and an amplifier 352 to operate a delay device 354. After a time delay, the device 354 operates a flip-flop 356 to its reset condition so that a negative enabling potential is applied to the inhibitor gate 278. The negative-going pulse supplied at the output of the amplifier 352 is also forwarded to a flip-flop 358 and operates this flip-flop to its reset condition. In this condition, the inhibitor 350 is blocked. Thus, the flip-flop 356 can be actuated only once for each start code received by the photocell 128*f*. When the control mark 104 subsequently passes the photocell 138*b*, the generated pulse passes through the enabled inhibitor circuit 278 and starts the generator 282. The eighth pulse supplied by the amplifier 284 passes through the gate 322 to operate the flip-flop 356 to its set condition so that the inhibitor 278 is blocked to prevent additional pulses from being supplied to the generator 282. The flip-flop 358 is operated to a set condition to enable the inhibitor 350 by the reset signal.

Although the present invention has been described with reference to a particular embodiment thereof, it will be understood that those skilled in the art can make many other modifications and embodiments that will fall within the spirit and scope of the principles of this invention.

What is claimed and desired to be secured by Letters Patent of the United States is:

1. In a data handling system using a record on which codes are recorded, checking means controlled by said record for determining whether the codes recorded on said record are correct or incorrect, and display means controlled by and responsive to the determination of an incorrect code by said checking means for providing a visual display of the portion of the record on which the incorrect code is recorded.

2. In a data handling system using a record on which codes are recorded, checking means controlled by said record for determining whether the codes recorded on said record are correct or incorrect, display means controlled by and responsive to the determination of an incorrect code by said checking means for providing a visual display of the portion of the record on which the incorrect code is recorded, and output means controlled by said checking means for utilizing said codes only when said codes are determined to be correct.

3. A data handling system for use with a record having codes recorded thereon comprising sensing means controlled by said record for supplying signals representing reproduced codes, checking means controlled by said signals for determining whether said reproduced codes are correct or incorrect, first display means for providing a visual display of a portion of said record, second display means controlled by said signals for providing a manifestation of a reproduced code, and means controlled by said checking means for operating said first display means to provide a visual display of the portion of the record from which an incorrect code was sensed and for operating said second display means to provide a manifestation of said incorrect code as reproduced from said record.

4. A data handling system for use with a record having codes recorded thereon comprising sensing means controlled by said record for supplying signals representing reproduced codes, checking means controlled by said signals for determining whether said reproduced codes are correct or incorrect, first display means for providing a visual display of a portion of said record, second display means controlled by said signals for providing a manifestation of a reproduced code, first means controlled by said checking means for operating said first display means to provide a visual display of the portion of the record from which an incorrect code was sensed and for operating said second display means to provide a manifestation of said incorrect code as reproduced from said record, an output device, and second means controlled by said checking means for rendering said output device responsive to reproduced codes that are correct.

5. A data handling system for use with a record having codes recorded thereon comprising sensing means controlled by said record for supplying signals representing reproduced codes, checking means controlled by said signals for determining whether said reproduced codes are correct or incorrect, first display means for providing a visual display of a portion of said record, second display means controlled by said signals for providing a manifestation of a reproduced code, first means controlled by said checking means for operating said first display means to provide a visual display of the portion of the record from which an incorrect code was sensed and for operating said second display means to provide a manifestation of said incorrect code as reproduced from said record, and second means controlled by said checking means for rendering said sensing means ineffective to supply signals representing further reproduced codes when an incorrect code is determined by said checking means.

6. A data handling system using a record on which codes are recorded comprising sensing means controlled by said record for supplying signals representing said codes, visual display means for providing a visual image of said record, drive means for moving said record relative to said sensing means and said visual display means, checking means connected to said sensing means and controlled by said signals for determining whether said codes are correct or incorrect, and means controlled by said checking means for arresting operation of said drive means when said codes are incorrect with said record in a position in which said visual display means provides a visual image of at least the portion of the record from which the incorrect code was sensed.

7. A data handling system comprising a signal source for supplying a series of code representing signals, checking means connected to said signal source and controlled by said signals for determining whether a code is correct or incorrect, display means for providing a visual display of a code, stop means for arresting operation of said signal source, means controlled by said checking means for operating said stop means to arrest operation of said signal source and for operating said display means to provide a visual display of the code represented by a signal only when said code is incorrect, an output device for utilizing said codes, and means controlled by said checking means for rendering said output device responsive to signals representing correct codes.

8. A data handling system for use with a record having plural bit codes recorded thereon comprising sensing means controlled by said record for sensing a plurality of said codes, checking means connected to and controlled by said sensing means for determining whether each of said concurrently sensed codes is correct or incorrect, and display means controlled by said checking means for providing a display of only the incorrect one or ones of the concurrently sensed codes.

9. A data handling system for use with a record having plural bit codes recorded thereon comprising sensing means controlled by said record for concurrently sensing a plurality of said codes, checking means connected to and controlled by said sensing means for determining whether each of said concurrently sensed codes is correct or incorrect, and display means controlled by said checking means for providing a simultaneous display of the concurrently sensed codes and for indicating the one or more of the displayed codes that is incorrect.

10. A data handling system for use with a record having codes recorded thereon comprising sensing means controlled by said record for concurrently sensing a plurality of said codes, checking means connected to and controlled by said sensing means for determining whether each of said concurrently sensed codes is correct or incorrect, first display means controlled by said checking means for providing a visual display of the portion of the record containing the concurrently sensed codes, and second display means controlled by said checking means for visually indicating the one or more of the visually displayed codes that is incorrect.

11. A data handling system for use with a record having codes recorded thereon comprising sensing means controlled by said record for concurrently sensing a plurality of said codes, checking means connected to and controlled by said sensing means for determining whether each of said concurrently sensed codes is correct or incorrect, a projection apparatus controlled by said checking means and said record for providing visual images of the concurrently sensed codes that include at least one incorrect code, and means controlled by said checking means for indicating the one or more of the visual images provided by the projection apparatus that represent codes that are determined to be incorrect by said checking means.

12. A data handling system comprising a signal source for supplying signals representing codes, register means controlled by said signals for storing a plurality of said codes, checking means controlled by said register means for determining whether the codes stored in said register means are correct or incorrect, a plurality of separate manual data entry means connected to said register means each representing one of the codes stored therein, and means controlled by said checking means for indicating the data entry means corresponding to an incorrect code stored in said register means.

13. A data handling system for use with a record having codes stored thereon comprising sensing means controlled by said record for supply signals representing codes, register means controlled by said signals for storing a plurality of said codes, checking means controlled by said register means for determining whether the codes stored in said register means are correct or incorrect, a plurality of separate manual data entry means connected to said register means each representing one of the codes stored therein, means controlled by said checking means for indicating the data entry means corresponding to an incorrect code stored in said register means, and means controlled by said record for providing a display of at least that portion of the record from which the codes stored in said register means were derived.

14. A data handling system for use with a record having plural bit codes recorded thereon comprising sensing means controlled by said record for supplying signals representing said codes, checking means controlled by said signals for determining whether said codes are correct or incorrect, display means including means for visually displaying each bit of a code, and means controlled by said checking means only when a code is incorrect for operating said display means to provide a visual display of each of the sensed bits of an incorrect code.

15. A data handling system comprising a signal source supplying signals representing a plural bit code, register means controlled by said signals for storing a code, means connected to said register means including a plurality of manually operable keys corresponding to the bits in the code, and means controlled by said register means for selectively illuminating said keys in accordance with the code stored in said register means.

16. The system set forth in claim 15 including checking means controlled by said register means for determining whether the code stored therein is correct or incorrect, and means controlled by said checking means for preventing the illumination of said keys when a correct code is stored in said register means.

17. A data handling system for use with a record having plural bit codes recorded thereon comprising sensing means controlled by said record for supplying signals representing a plural bit code, register means controlled by said signals for storing a code, means connected to said register means including a plurality of manually operable keys corresponding to the bits in the code, means controlled by said register means for selectively illuminating said keys in accordance with the code stored in said register means, and means controlled by said record for providing a visual image of the portion of the record from which the code stored in the register means was derived.

18. A data handling system comprising a signal source for supplying signals representing codes, register means controlled by said signals for storing the codes represented thereby, checking means connected to said register means for determining whether a stored code is correct or incorrect, correcting means connected to said register means for changing the code stored therein, and means operable following the operation of said correcting means for operating said checking means to again determine whether the code stored in said register means is correct or incorrect.

19. A data handling system comprising a signal source for supplying signals representing codes, register means controlled by said signals for storing the codes represented thereby, checking means connected to said register means for determining whether a stored code is correct or incorrect, correcting means connected to said register means for changing the code stored therein, an output device for utilizing the codes stored in said register means, and means controlled by said checking means for rendering said register means effective to control said output device either in response to the storage of a correct code in said register means or in response to the correction of an incorrect code stored in said register means.

20. A data handling system for use with a record on which codes are recorded comprising sensing means controlled by said record for supplying signals representing reproduced codes, drive means for moving said record relative to said sensing means, register means controlled by said signals for storing the reproduced codes, checking means controlled by said register means for determining whether the stored codes are correct or incorrect stop means controlled by said checking means for arresting operation of said drive means when an incorrect code is stored in said register means, correcting means connected to said register means for correcting the code stored therein, and means controlled by said checking means when correct codes are stored in said register means by said correcting means for rendering said stop means ineffective.

21. The system set forth in claim 20 including reset means controlled by said checking means for clearing said register means when correct codes are stored therein, and means controlled by said checking means for rendering said reset means ineffective when an incorrect code is stored in said register means.

22. A data handling system for use with a record having codes recorded thereon comprising sensing means controlled by said record for providing signals representing reproduced codes, drive means for removing said record relative to said sensing means, register means connected to said sensing means and operated by said signals to store a reproduced code, checking means controlled by said register means for determining whether a stored code is correct or incorrect, first means controlled by said checking means for arresting operation of said drive means when an incorrect code is stored in said register means, correcting means connected to said register means for correcting the code stored therein, and start means operative to render said first means ineffective if said correcting means have stored a correct code in said register means.

23. A data handling system for use with a record having codes recorded thereon comprising sensing means controlled by said record for providing signals representing reproduced codes, register means connected to said sensing means and operated by said signals to store a reproduced code, checking means controlled by said register for determining whether a stored code is correct or incorrect, display means controlled by said checking means for providing a visual display of an incorrect code when an incorrect code is stored in said register means, correcting means connected to said register means for correcting the code stored therein, means operable following the actuation of said correcting means for rendering said display means ineffective.

24. A data handling system for use with a record having a series of successive lines of codes recorded thereon comprising sensing means controlled by said record for reproducing each of the lines of codes in sequence, drive means for moving said record relative to said sensing means, register means controlled by said sensing means for storing all of the codes in a sensed line thereof, checking means connected to and controlled by said register means for determining whether the stored codes are correct or incorrect, stop means controlled by said checking means for arresting operation of said drive means when at least one incorrect code is stored in said register means, display means controlled by said checking means for providing a visual display of said line of codes and for indicating the one or ones of said codes that are incorrect, correcting means connected to said register means for correcting the codes stored therein, means for operating said checking means to check the corrected codes stored in said register means, an output device controlled by said register means, means controlled by said checking means for rendering said register means effective to control said output device when correct codes are stored in said register means by said sensing means, and means controlled by said checking means for rendering said stop means ineffective and for rendering said register means effective to control said output device when correct codes are stored in said register means by said correcting means.

25. A data handling system for use with a record having a series of successive lines of codes recorded thereon comprising sensing means controlled by said record for reproducing each of the lines of codes in sequence, drive means for moving said record relative to said sensing means, register means controlled by said sensing means for storing all of the codes in the sensed line thereof, checking means connected to and controlled by said register means for determining whether the stored codes are correct or incorrect, stop means controlled by said checking means for arresting operation of said drive means when at least one incorrect code is stored in said register means, first display means controlled by said checking means for providing a visual image of said sensed lines of codes, second display means controlled by said checking means for indicating the portion of the visual image representing codes that are incorrect, correcting means connected to said register means for correcting the codes stored therein, means for rendering said first and second display means ineffective and for operating said checking means to check the corrected codes stored in said register means, an output device controlled by said register means, and means controlled by said checking means for rendering said register means effective to control said output device when correct codes are stored in said register means by said sensing means or when correct codes are stored in said register means by said correcting means.

26. A data handling system for use with a record element having visible data recordings comprising data storage means for storing data reproduced from the record, light responsive means coupled to the data storage means for controlling the data storage means to store data reproduced from the data recordings on the record element, drive means for producing relative movement between the record element and the light responsive means so that the data recordings are sensed by the light responsive means and stored in the data storage means, checking means controlled by the data reproduced from the data recordings on the record element for determining whether the reproduced data is correct or incorrect, visual display means for providing a visual display of the visible data recordings on the record element, and means controlled by the checking means when the reproduced data is determined to be incorrect for controlling the visual display means to provide a visual display of at least the part of the record element containing the visible data recordings from which the incorrect reproduced data was derived by the light responsive means.

27. The data handling system set forth in claim 26 including manually operable data entering means connected to the data stroage means for controlling the data storage means to store correct data in place of incorrect data reproduced from the record element, and means for enabling the manually operable data entering means when the checking means determines incorrect data reproduced from the record element.

References Cited by the Examiner

UNITED STATES PATENTS

| | | | |
|---|---|---|---|
| Re. 23,601 | 12/1952 | Hamming et al. | 340—146.1 |
| 2,685,683 | 8/1954 | Holden et al. | 235—153 X |
| 2,702,380 | 2/1955 | Brustman | 340—172.5 |
| 2,719,959 | 10/1955 | Hobbs | 340—146.1 |
| 2,721,990 | 10/1955 | McNaney | 340—174 |
| 2,843,799 | 7/1958 | Hook | 340—173 |
| 2,920,818 | 1/1960 | Taylor et al. | 235—153 X |
| 2,973,506 | 2/1961 | Newby | 340—146.1 |
| 3,051,955 | 8/1962 | Pfleger et al. | 235—153 X |

ROBERT C. BAILEY, *Primary Examiner.*

IRVING L. SRAGOW, EVERETT R. REYNOLDS, MALCOLM A. MORRISON, *Examiners.*